Dec. 13, 1960     G. Z. EDWARDS ET AL     2,963,709
QUICK COUPLING FOR MOLDED FACE-PROTECTIVE SHIELD AND HEADGEAR
Filed March 27, 1959
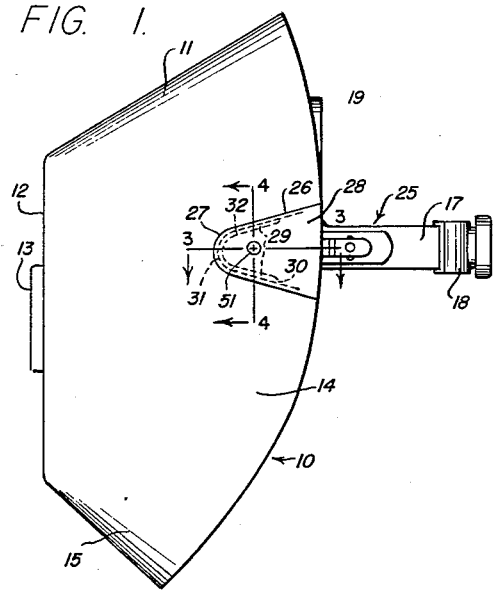
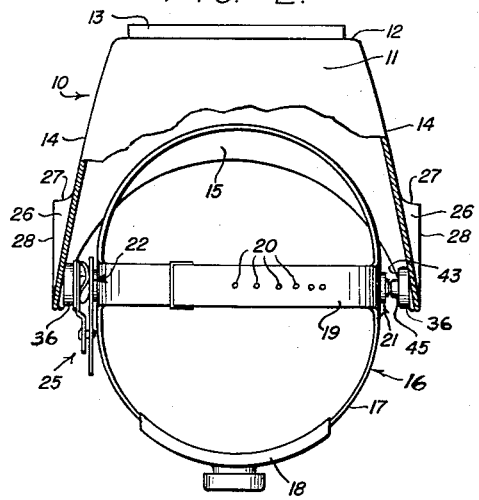
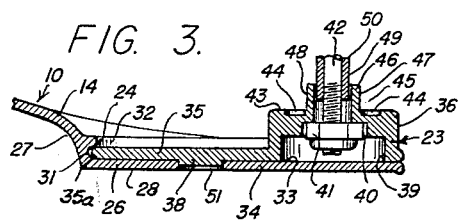
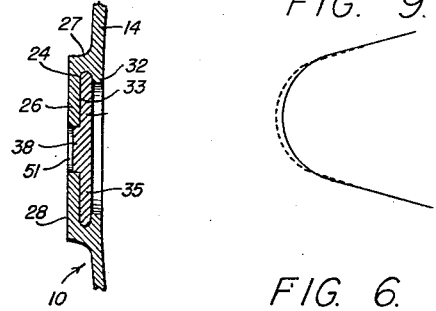
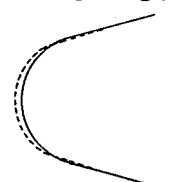
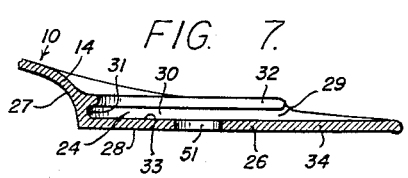
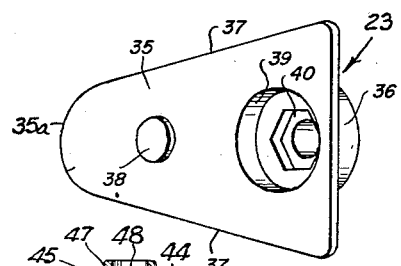
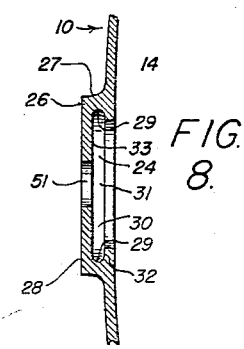
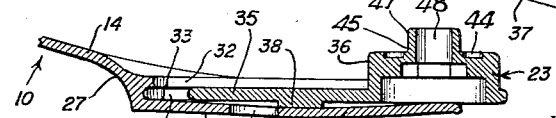
INVENTOR.
GEORGE ZAHNOR EDWARDS
GEORGE A. LANGFORD
BY
ATTORNEYS

United States Patent Office 2,963,709
Patented Dec. 13, 1960

2,963,709

QUICK COUPLING FOR MOLDED FACE-PROTECTIVE SHIELD AND HEADGEAR

George Zahnor Edwards and George A. Langford, 233 S. 5th St., W., Salt Lake City, Utah Filed Mar. 27, 1959, Ser. No. 802,489

4 Claims. (Cl. 2—8)

Our invention relates to face-protective shield and headgear combinations, and is particularly directed to arrangements for mounting molded face-protective shields on headgear.

The art of welding under the exacting needs of modern industry has made necessary the development of face-protective shields, or helmets, as they are often called, for preventing injury to welders' eyes and faces from intense glare, radiated heat, and hot spark debris. Manufacturers of such face protective equipment are constantly striving to provide greater comfort, convenience, and safety for the welder at minimum cost. To these ends, many manufacturers have gone to one-piece plastic shields. This is especially so because welding shields fabricated from sheet, vulcanized fiber, as has been customary, have been found to absorb moisture and to present warpage problems. They also require special strips of electrical insulation to be applied over the lines of rivets utilized for fastening seams and over other metal parts, in order to comply with Government specifications requiring that the interior of a welding shield be completely insulated, electrically, from the exterior.

Molding the face shield as an integral unit from a glass fiber reinforced plastic material has eliminated warpage and has, for the most part, inherently provided the required electrical insulation. Yet, pivotal coupling devices employed with these molded plastic shields for attachment to headgear have still required the application of special coverings of electrical insulating material, because of metal parts exposed exteriorly and extending through the molded plastic to the interior of the shield. Such coupling devices have also required the use of screws and similar fastening elements for installation and have often required the removal of screws, nuts, etc. to accomplish interchange of one type of headgear for another in the use of the shield.

It is therefore a major object of this invention to provide an improved pivotal type of quick coupling for mounting a molded plastic, face-protective, welder's shield or helmet on a headgear.

Another object is to so construct such coupling that it is, itself, largely molded from plastic material to eliminate metal fastening devices which necessitate special provisions for electrical insulation.

A feature in the achievement of these objects is the provision, in each coupling, of a mounting member attached to the headgear and a receiving pocket molded directly in the plastic material of the shield, together with means for locking such mounting member in the pocket. Such mounting member and such receiving pocket are advantageously of cooperating wedge formation, so the mounting member, or wedge insert, as it may appropriately be called, fits tightly in the wedge pocket.

The locking means advantageously includes locking elements in the form of a pin-like protuberance, molded integrally with the wedge insert and projecting from the outer face thereof, and a receiving opening in the opposing wall of the pocket. The pin snaps into such receiving opening as the wedge insert is pushed into place in the pocket, the plastic walls of the pocket flexing sufficiently to permit entry of the wedge insert in this manner. The parts thus lock tightly together without the need of metal fasteners.

A decided advantage of this coupling is the fact that the shields nest together snugly for shipment and storage.

Further objects and features of the invention will appear from the following detailed description of the presently preferred construction illustrated by way of example in the accompanying drawing.

In the drawing:

Fig. 1 represents a left-side elevation of a welder's face-protective shield or helmet and headgear combination coupled together in accordance with the invention;

Fig. 2, a top plan view of the same combination, with the top of the shield broken away to reveal the pivotal mounting mechanism between shield and headgear;

Fig. 3, a horizontal section taken on the line 3—3 of Fig. 1, illustrating the wedge pocket and wedge insert coupling in detail;

Fig. 4, a vertical section taken on line 4—4 of Fig. 3;

Fig. 5, a sectional view similar to that of Fig. 3 but showing the wedge insert only partially inserted, short of the locked position, in the shield wedge pocket;

Fig. 6, a perspective view of one of the wedge inserts, looking toward the pivotal mounting face thereof;

Figs. 7 and 8, views similar to those of Figs. 3 and 4, respectively, but showing one of the wedge pockets as it appears empty, without the wedge insert; and Fig. 9, a diagrammatic showing of the relationship between pocket and wedge insert which provides the wedge action, the solid line designating the tip portion of the wedge insert and the broken line the closed end of the pocket.

Referring to the drawing:

The face-protective shield or welder's helmet 10 of Figs. 1 and 2 is molded as one piece from a glass fiber reinforced plastic material, which, as is well known, is stiffly flexible in character. It is formed with a crown wall 11 for top-of-the-head protection, a front wall 12 for face and eye protection, a window 13 of glass or other suitable transparent material in the front wall, mutually opposite lateral or side walls 14 for side-of-the-head protection, and a lower wall 15 for chin protection.

The headgear 16 on which shield 10 is pivotally mounted is, in this illustrated instance, of an open, band type comprising a headband 17 equipped with size adjusting means 18, and a crownband 19 having provisions at 20 for size adjustment. Pivotal mounting mechanism 21 extends outwardly from one side of headgear 16 and pivotal mounting mechanism 22 extends outwardly from the other side of headgear 16. Each of these pivotal mounting mechanisms 21 and 22 has a wedge insert 23 at its outer end. These wedge inserts 23 provide for quick and easy attachment of the headgear to the shield by insertion of such inserts in respective wedge pockets 24, which are integral parts of shield 10—one being molded in each side wall 14.

Pivot mounting mechanism 22 includes movement limiting and position adjusting structure 25 for shield 10 in order that the shield may be easily shifted back and forth from an out-of-the-way position above the head to a face-protective work position and so that it may also be adjusted in position with respect to the face for aligning window 13 with the eyes. Such mechanism 22 is the subject of our copending application Serial No. 802,996, filed March 30, 1959, entitled "Mechanism for Mounting a Welding Shield on a Headgear."

Pivot mounting mechanisms 21 and 22, carrying wedge inserts 23, as here shown with the headband type of headgear 16, may also be provided in connection with usual styles of hard hats (not shown). Welders often work in hazardous areas, where they are required to wear hard hats with the face-protective shields. When such mechanisms and wedge inserts are incorporated with both a headgear 16 and a hard hat, a welder need have only one shield for both types of headgear. The wedge inserts of either may be easily removed from and inserted in the wedge pockets 24 of the shield to quickly effect the interchange.

Referring to Figs. 3, 4 7 and 8, each wedge pocket 24 is molded integrally into its corresponding side wall 14 of the shield and is open to the interior of the shield. Each is contained within an outwardly protruding boss 26 which has a streamlined, curved surface 27 blending a broad flat, surface 28 into a corresponding one of the outwardly diverging side walls 14 of the shield as such side walls extend to the rear. The surfaces 28 at opposite sides of the shield are desirably parallel, one with the other. The curved surfaces 27 tend to deflect any foreign objects coming into contact with shield 10 in the region bosses 26 that might otherwise catch thereon.

As seen in Fig. 1, each boss 26 becomes wider from front to rear to provide for divergence of the side edges 29 of continuous groove 30 from its curved forward end 31 to its rear. Groove 30 of each wedge pocket 24 has a lip 32 in order that a wedge anchor insert 23 may be held therein, between lip 32 and the inner surface 33 of pocket wall 34.

Shield 10 is so shaped and molded with the integral wedge pocket 24 as to compactly nest in the interior of a like shield to save both storage and shipping space. For example, twelve of these shields 10 when nested together occupy only the space of five older type shields.

Wedge inserts 23 each include a wedge-shaped, molded plastic member 35 of uniform thickness with a curved forward end or tip 35a and rearwardly diverging sides 37 which conform to a wedge pocket groove 30. An integrally molded lock pin 38 projects from the outer face of each member 35 and an integrally molded projection 36 for the pivotal mounting mechanism extends inwardly from the rear portion of each member 35, as complementary locking elements, to complete the wedge insert 23.

With a molded plastic shield or welder's helmet 10 having wedge pockets and with the wedge inserts also of plastic, we have eliminated metal screws or rivets extending to the outside of shield 10 and meet government electrical insulation safety specifications without more, provided the plastic material is of electrical insulating character, as it usually is.

Each pivot mount projection 36, see particularly Fig. 6, is provided with an opening 39 having a multi-sided extension 40 for non-rotatably restraining a nut 41, Fig. 3, therein and to provide ample clearance from wedge pocket surface 33 for the nut 41 and a pivot mounting bolt 42. Each projection 36 has a shoulder 43 with ball-retaining openings 44 and a rectangular projection 45 for engaging and cooperating with members of the shield position adjusting structure 25.

Extension 46 of projection 36 has a cylindrical outer surface 47 which aligns various members of the shield adjusting structure 25. The inner cylindrical opening 48 through extension 46 and projection 36 pivotally engages cylindrical bearing surface 49 of an outwardly extended headgear projection 50, through which a pivot mounting bolt 42 extends from each pivotal mounting mechanism 21 and 22.

Integral molded lock pin 38 of each wedge insert 23 locks the insert in place in a wedge pocket 24 by snapping into a lock opening 51 provided therefor in each wedge pocket wall 34. Referring to Fig. 5, it will be seen that, as wedge inserts 23 are being inserted into place in the wedge pockets 24 of the shield, each wall pocket 34 is resiliently deformed outwardly by lock pin 38 and snaps back into place again when lock pin 38 comes into registry with wall lock opening 51.

Cooperative wedge action between insert and pocket, making for desired tightness of fit, is achieved largely by configurating the tip portion of each wedge insert 23 and the tip portion of each pocket 24 somewhat as shown by the solid line and the broken line, respectively, in Fig. 9. It will be noted that the width of the insert just above the tip thereof is somewhat greater than the corresponding width of the pocket, and that the depth of the pocket is somewhat greater than the depth of the insert, so that the latter does not seat on the bottom of the pocket, even though the insert is snugly fitted into the pocket.

Although wedge inserts 23 resiliently deform to a slight degree, substantially all the resilient deformation to provide room for lock pin 38 occurs in the walls 34 as the wedge anchor inserts 23 are inserted in place in wedge pockets 24 and also as they are removed. A tool, such as a thin screw driver, may be inserted between a wedge insert 23 and the adjacent pocket wall 34, and, then, with the screw driver end in effective proximity to the lock pin 38, a slight twisting of the screw driver resiliently deforms wall 34 to release opening 51 from pin 38 to permit withdrawal of wedge insert 23 from the pocket. This operation is repeated for both sides of the shield, the screw driver withdrawn and then the headgear 16 or hard hat with both wedge anchor inserts 23 is drawn back from the shield or welder's helmet 10.

Whereas this invention is here illustrated and described with respect to a specific embodiment thereof, it should be realized that various changes may be made without departing from the essential contributions to the art made by the teachings hereof.

We claim:

1. A welding shield and headgear combination arranged to be disengageably coupled, comprising a headgear having a portion adapted to encircle the head of a wearer; a face-protective shield adapted for pivotal mounting on the headgear at mutually opposite sides of the head-encircling portion thereof to swing upwardly and downwardly about and relative to the forward part of said head-encircling portion, said shield being of electrically insulating material which is stiffly flexible and formed to provide integral pockets at mutually opposite lateral sides of the shield, respectively, and interiorly of said shield; pivotal couplings for disengageably securing the shield to the headgear, said couplings including respective inserts for snugly fitting into the pockets of said shield and respective pivotal mounting means securing said inserts to the head-encircling portion of said headgear; and respective sets of complementary locking elements associated with the inner walls of the respective pockets and with the outer walls of the respective inserts, for securing said inserts within said pockets.

2. The combination set forth in claim 1, wherein each pocket is made up of an outer wall constituting a part of the protective expanse of the shield and an inner, peripheral lip which leaves the pocket open interiorly of the shield, and each set of locking elements comprises an opening in the outer wall of the corresponding pocket and a complementary protuberance projecting from the outer face of the corresponding pocket insert; said protuberance benig of electrically insulating material to protectively fill the complementary opening into which it fits.

3. The combination set forth in claim 2, wherein the welding shield has a front wall and rearwardly projecting peripheral walls with an open rear, said peripheral walls diverging from one another rearwardly so the shield may be nested with other like shields for storage, and outwardly protruding bosses extending forwardly from the rear edges of the mutually opposite lateral sides of said shield, respectively, said bosses being convergent forwardly and outwardly of the shield and defining substantially similarly configured recesses within the shield for accommodating corresponding bosses of said like shields when nested therewith, the recess of each boss being bordered forwardly and laterally by a lip projecting inwardly of the boss and overhanging the recess to provide a pocket which is one of the pockets of claim 2 provided at mutually opposite lateral sides of the shield for receiving the inserts of the pivotal couplings.

4. A welding shield formed of stiffly flexible material and having a front wall and rearwardly projecting peripheral walls with an open rear, said peripheral walls diverging from one another rearwardly so the shield may be nested with other like shields for storage, and outwardly protruding bosses extending forwardly from the rear edges of the mutually opposite lateral sides of said shield, respectively, said bosses being convergent forwardly and outwardly of the shield and defining substantially similarly configured recesses within the shield for accommodating corresponding bosses of said like shields when nested therewith, the recess of each boss being bordered forwardly and laterally by a lip projecting inwardly of the boss and overhanging the recess to provide a pocket for receiving and securing a shield-mounting member of the headgear.

References Cited in the file of this patent
UNITED STATES PATENTS

| | | |
|---|---|---|
| 2,585,937 | Johnson et al. | Feb. 19, 1952 |
| 2,788,558 | Bowers | Apr. 16, 1957 |
| 2,881,442 | Sowle | Apr. 14, 1959 |